United States Patent
Pack et al.

[11] Patent Number: 5,412,864
[45] Date of Patent: May 9, 1995

[54] METHOD FOR REMOVING OUTER PROTECTIVE LAYER FROM ELECTRICAL CABLE

[75] Inventors: Arthur V. Pack, Monroe, N.Y.; Wesley R. Kegerise, II, Oakland, N.J.

[73] Assignee: The Okonite Company, Ramsey, N.J.

[21] Appl. No.: 136,657

[22] Filed: Oct. 14, 1993

Related U.S. Application Data

[63] Continuation-in-part of Ser. No. 801,452, Dec. 2, 1991.

[51] Int. Cl.6 .................... H01R 43/00; B23P 19/00
[52] U.S. Cl. .................................. 29/825; 29/758; 174/23 R; 174/72 R; 174/885
[58] Field of Search ............... 29/825, 758; 174/72 R, 174/88 S, 23 R

[56] References Cited

U.S. PATENT DOCUMENTS

| | | |
|---|---|---|
| 1,969,764 | 8/1934 | Soutter, Jr. . |
| 4,876,792 | 10/1989 | Black . |
| 4,934,219 | 6/1990 | Edwards . |
| 4,945,636 | 8/1990 | Takizawa . |
| 4,953,428 | 9/1990 | Commes . |
| 4,958,433 | 9/1990 | Persson . |
| 4,972,583 | 11/1990 | Pinchon . |
| 4,979,299 | 12/1990 | Bieganski . |
| 4,985,996 | 1/1991 | Steiner . |
| 5,009,005 | 4/1991 | Bieganski . |
| 5,009,006 | 4/1991 | Sawyer et al. . |
| 5,009,130 | 4/1991 | Bieganski . |
| 5,023,995 | 6/1991 | Kaplan . |
| 5,036,734 | 8/1991 | Morrow . |
| 5,062,192 | 11/1991 | Sawyer et al. . |
| 5,072,632 | 12/1991 | Sayyadi . |
| 5,074,043 | 12/1991 | Mills . |
| 5,107,735 | 4/1992 | Ramun et al. . |
| 5,109,590 | 5/1992 | Endres . |
| 5,127,153 | 7/1992 | Mitra . |
| 5,138,910 | 8/1992 | Ishikawa et al. . |
| 5,140,751 | 8/1992 | Faust . |
| 5,142,780 | 9/1992 | Brewer . |
| 5,150,522 | 9/1992 | Gwo-Jiang . |
| 5,166,473 | 11/1992 | Faust et al. . |
| 5,182,859 | 2/1993 | Yoshimori . |
| 5,189,786 | 3/1993 | Ishikawa et al. . |
| 5,265,326 | 11/1993 | Scribner ........................... 29/758 |
| 5,306,868 | 4/1994 | Faust et al. . |

*Primary Examiner*—Carl J. Arbes
*Attorney, Agent, or Firm*—Hopgood, Calimafde, Kalil & Judlowe

[57] ABSTRACT

Disclosed are electrical cable strippers and methods for their use, particularly, stripping tools and methods adapted for use with specific electrical cables such as naval electrical power cables and underground primary distribution jacketed cables.

3 Claims, 6 Drawing Sheets

METHOD FOR REMOVING OUTER PROTECTIVE LAYER FROM ELECTRICAL CABLE

This is a continuation-in-part application of pending application Ser. No. 07/801,452 entitled "Naval Electrical Power Cable and Method of Installing the Same" filed on Dec. 2, 1991.

FIELD OF INVENTION

The present invention relates to electrical cable strippers and methods for their use. More particularly, the present invention concerns stripping tools and methods adapted for use with specific electrical cables such as naval electrical power cables and underground primary distribution jacketed cables.

BACKGROUND OF THE INVENTION

Known naval power cables and underground jacketed cables suffer drawbacks when stripping of the outer jacket layers is required. For instance, in FIG. 1 of the drawings, a typical multi-conductor power cable is illustrated. In general, such prior art power cable 1 comprises a core conductor assembly 2 consisting of triplexed insulated conductors 3, a water blocking layer 4 extruded over the core conductor assembly, a non-uniform layer of binder tape 5 helically wound over the blocking layer, and a jacket layer 6 extruded over the binder tape, as shown.

In order to expose the insulated electrical conductors for spreading and connection to electrical equipment in cable spreading rooms, large lengths of water blocking and jacket material must be stripped away to freely expose the core conductor assembly. With such prior art power cable, removal of the water blocking and jacket material requires cutting each layer away bit by bit using sharp cutting tools, the nature of which poses great safety hazards to workers.

In addition to requiring arduous effort and numerous hours and sometimes a day or more to strip away the water blocking and jacket material, often workers wielding the sharp cutting tools inadvertently cut into the core conductor assembly, damaging the electrical insulation on the conductors. Frequently, these workers also injure themselves during such stripping operations. For example, workers can cut themselves with the sharp cutting tools. Also they are exposed to the risk of slipping and falling on rubber chips and shavings which fall to the floor during cable stripping operations.

Thus, there is a need in the art to provide improved tools and methods for stripping electrical cable without the accompanying shortcomings and drawbacks of the prior art.

Accordingly, it is an object of the present invention to provide a naval power cable which can be easily stripped of its water blocking material and outer jacket layer with a substantial reduction in stripping time and an added measure of safety.

Another object of the present invention is to provide a naval power cable, in which the water blocking material and outer jacket layer are tenaciously bonded together and can be easily cut without the use of sharp cutting tools so that large lengths of power cable can be quickly and safely stripped aboard a naval vessel, by simply peeling away at most a few integrally bonded strips of water blocking and jacket material.

Another object is to provide a specialized stripping tool adapted for use with underground primary distribution jacketed cables, and a simple method of stripping the outer, extruded polymer sheat jackets of such cables with the specialized stripping tool.

A further object is to provide a stripping tool specially adapted for use with isolated wires that integrally form a metallic shield for underground primary distribution jacketed cables.

A yet further object is to provide a method of using the stripping tool for safe, quick and easy removal of outer jacket material from underground primary distribution jacketed cables.

These and other objects will become apparent hereinafter and in the claims.

SUMMARY OF INVENTION

In general, the naval power cable to be stripped, comprises a plurality of insulated electrical conductors, at least a pair of strip cords, a water blocking layer, and a jacket layer. Each electrical conductor has a longitudinal extent and is helically intertwined with the other electrical conductors, to form a core conductor assembly having at least a pair of outer interstices adjacent to the insulated electrical conductors. Each strip cord is disposed along the longitudinal extent of the core conductor assembly, and extends into and out of the outer interstices in a spatially periodic manner. The water blocking layer is disposed about the core conductor assembly and the strip cords and prevents passage of water along the interstices about the electrical conductors. The jacket layer is disposed over and adjacent to the water blocking layer and is physically associated therewith.

Several important advantages are derived using the strip cord arrangement of the present invention. In particular, the spatially periodic pattern of the strip cords along the longitudinal extent of the core conductor assembly provides a sufficient reserve length of strip cord between the core conductor assembly and the outer blocking layers. This permits the resulting cable to undergo severe bends as the power cable is worked during installation.

An additional advantage derived using the strip cord arrangement of the present invention is that it is significantly easier to cut through the water blocking and outer jacket layers during stripping operations, since each strip cord is not always buried at the full depth of any one outer interstice. Consequently, placement of a pair of strip cords about the core conductor assembly in a diametrically opposed manner ensures that total thickness of water blocking and outer jacket layer material at any cross-sectional portion of the cable that must be cut, is substantially constant along its length.

In general, the method of stripping the outer layers from the naval power cable involves, first, exposing a portion of each strip cord. Then, each strip cord is gripped with a tool, preferably blunt and having a longitudinal extent. The tool is then manually gripped and pulled, thereby pulling the strip cord longitudinally along the power cable to simultaneously cut the jacket layer and the water blocking layer, and form two or more strip-like layers of jacket layer and water blocking material. Thereafter, each strip-like layer is peeled away from the underlying core conductor assembly to expose the insulated conductors for spreading and connection to equipment of various types.

In another embodiment, the underground primary distribution jacketed cables to be stripped, comprises a central core of a plurality of metal, electrical conductors, several layers of insulation, a metallic shield layer consisting of metal wires either helically or longitudinally applied, and an outer jacket layer. The layers of insulation are disposed about the core conductor assembly, the metallic shield layer is disposed about the outermost insulation layer, and the outer jacket layer is disposed over and adjacent to the metallic shield layer.

The simple, yet specialized tool, specifically adapted for use in stripping the underground primary distribution jacketed cables comprises a hollow cylindrical tube or pipe made of a suitable rigid material such as metal or polymeric composite, with a first and second end. Near the first end is produced a cylindrical aperture such as by drilling radially through from at least one outer surface of the tube towards the interior lumen. The burr formed in the inside of the tubing is not removed and is used as part of the stripping method. An optional grip may be placed around the second end of the tube.

In terminating or splicing the above described underground primary distribution jacketed cable, it is necessary to remove the outer cable components from 12 to 48 inches. This includes removal of the outer jacket, the metallic shield and insulation layers. The specialized stripping tool and associated method expedites this process by quickly, easily and safely stripping the outer jacket layer.

The metallic shield layer, consisting of metal wires either helically or longitudinally applied, provide a spatially periodic pattern of potential strip cords along the longitudinal extent of the cable between the insulation layers and the outer jacket layer. This permits the resulting cable to be easily stripped of its outer jacket layer.

In general, the method of stripping the outer layers from the underground primary distribution jacketed cable involves first, exposing a portion each of at least two wires that form the metallic shield. When two wires are used, they should be 180° apart (when three wires are used they should be 120° apart, etc.) Only a very small portion of the metal wire need be exposed initially (usually about 1 to 3 inches), and the exposed wire is crimped at its end at a 90° angle and inserted into the aperture created in the special stripping tool. The burr at the end of the aperture holds the wire in the tube when the strip tool is pulled. Use of a rolling action causes the strip tool to pull on the wire which cuts through the outer jacket. This is repeated on the second wire (if two wires are exposed) which allows the longitudinally cut jacket to be peeled away, exposing the layers underneath for further work.

DETAILED DESCRIPTION

In one illustrated embodiment of the present invention, generally shown in FIGS. 3 through 6, power cable 10 comprises three electrical conductors 11A, 11B and 11C, having a longitudinal extent and being insulated by first and second layers 12 and 13 of insulation material. Notably, however, in accordance with the principles of the present invention, the naval power cable may include a number of electrical conductors other than three. As shown the electrical conductors are helically intertwined with each other so as to form a core conductor assembly, generally indicated by reference number 15.

Figures 1, 2, 3, 4:
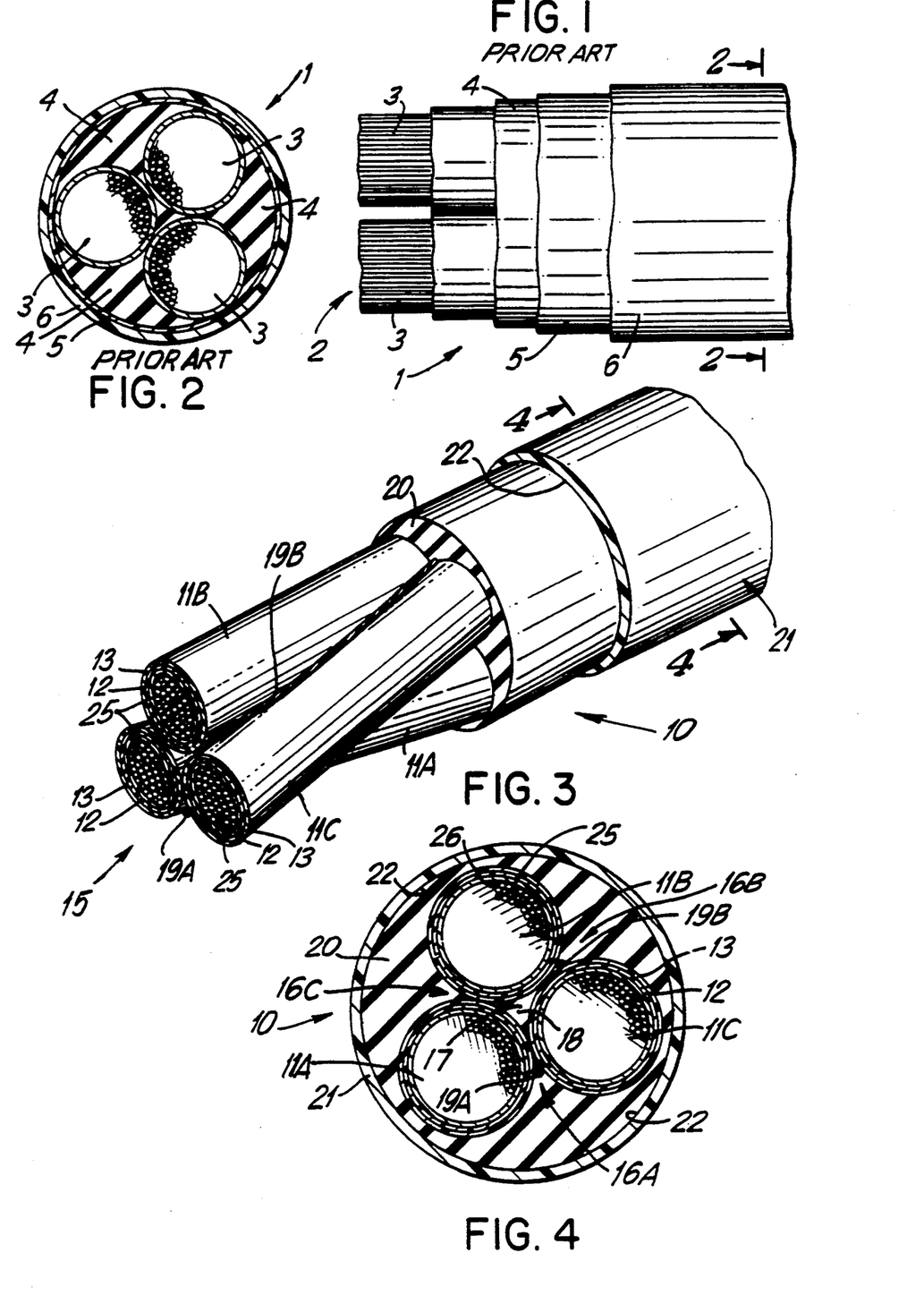
FIG. 1 is an elevated, partially broken away side view of the prior art naval power cable.
FIG. 2 is a cross-sectional view of prior art naval power cable, taken along line 2—2 of FIG. 1.
FIG. 3 is a perspective, partially broken away view of naval power cable constructed in accordance with the principles of the present invention.
FIG. 4 is a cross-sectional view of naval power cable of the present invention, taken along line 4—4 of FIG. 3.

As illustrated in FIGS. 3 and 4, core conductor assembly 15 has three outer interstices, indicated by reference numerals 16A, 16B and 16C, which are adjacent to the electrical conductors. Also, core conductor assembly 15 has one inner interstice 17 bounded by insulated conductors 11A, 11B and 11C, as shown. Inner interstice 17 is filled with water block strip 18, which is compressed between the helically intertwined insulated conductors.

Figure 5:
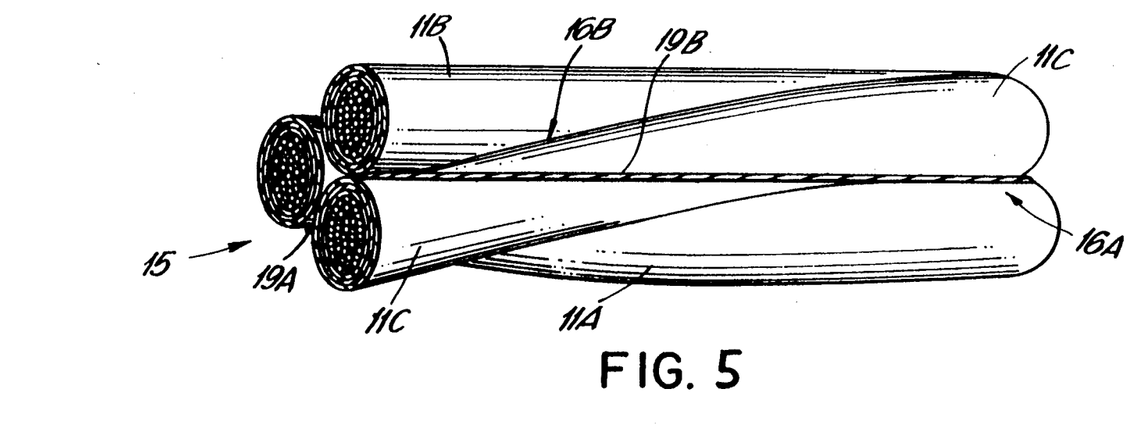
FIG. 5 is an elevated perspective view of a section of the helically wound core conductor assembly and strip cords of the illustrative embodiment arranged in accordance with the principals of the present invention.
Figure 6:
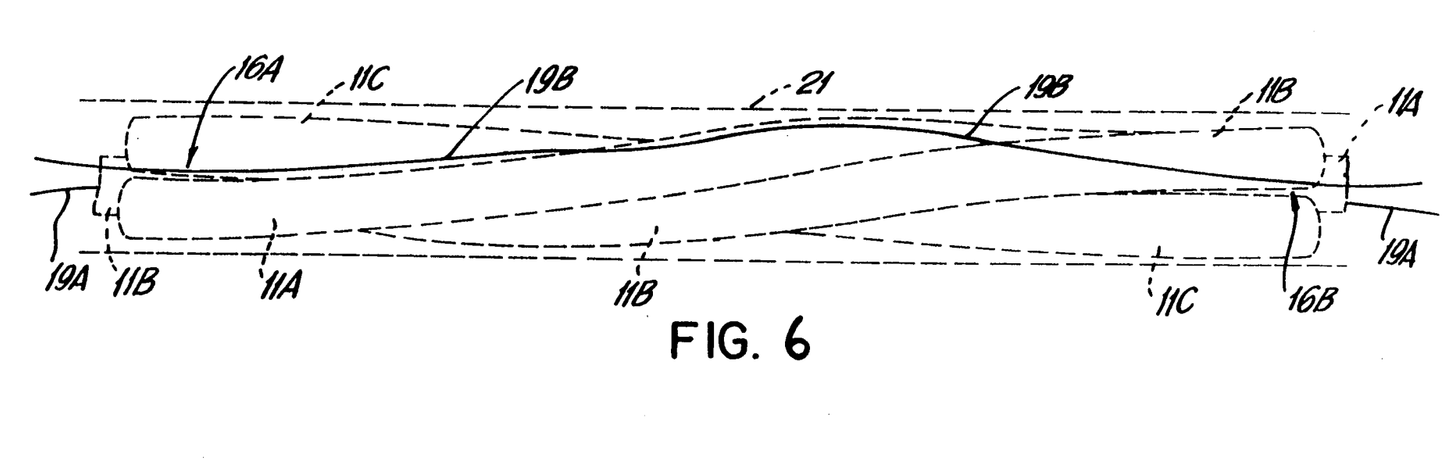
FIG. 6 is an elevated side view of the naval power cable of the present invention, showing the spatially periodic arrangement of the strip cords in relation to the outer interstices of the core conductor assembly.

Along the entire longitudinal extent of core conductor assembly 15, a pair of strip cords 19A and 19B are disposed in diametrically opposed manner. As illustrated in FIGS. 3, 5 and 6, each strip cord is disposed along the longitudinal extent of the core conductor assembly and extends into and out of each interstice 16A, 16B and 16C in a spatially periodic manner. As shown in FIG. 6, the path that each strip cord undergoes along the longitudinal extent of the naval power cable is sinusoidal-like in that at one location along the cable, strip cord 19B is disposed deep within outer interstice 16B and then travels along the surface of conductor cord 11C where eventually it is disposed at the outermost perimeter of the core conductor assembly. Then, strip cord 19B travels along the surface of conductor cord 11A and eventually is disposed deep within the outer interstice 16C. This spatially periodic pattern repeats itself along the entire longitudinal extent of the core conductor assembly.

Notably, strip cord 19A travelling diametrically opposite strip cord 19B is 180 degrees out of phase with strip cord 19A in that strip cord 19B will be disposed at the outermost perimeter of the core conductor assembly whenever strip cord is 19A is disposed deepest within an outer interstice, and vice versa. In the illustrated embodiment each strip cord 19A and 19B comprises high tensile strength cord made from fibers commercially available under the tradename Kevlar ®. Also suitable are cords made of polymeric materials such as a polyester or nylon. Preferably, these strip cords are made with brightly colored pigments which can be easily discerned against the naval power cable.

Disposed over and about core conductor assembly 15 and strip cords 19A and 19B is a water blocking layer 20 which is formed from a first cross-linkable material and has a generally cylindrical outer surface geometry. The function of water blocking layer 20 is to prevent passage of water along the interstices about the insulated electrical conductors. Disposed directly over and adjacent to water blocking layer 20 is an outer jacket layer 21, which is formed from a second cross-linkable material. As will be described in greater detail hereinafter, jacket layer 21 preferably is covalently bonded to water blocking layer 20 across the interface 22 therebetween. Such covalent bonding is achieved by cross-linking the water blocking layer and jacket layer materials at the interface 22, in particular.

Figure 7:
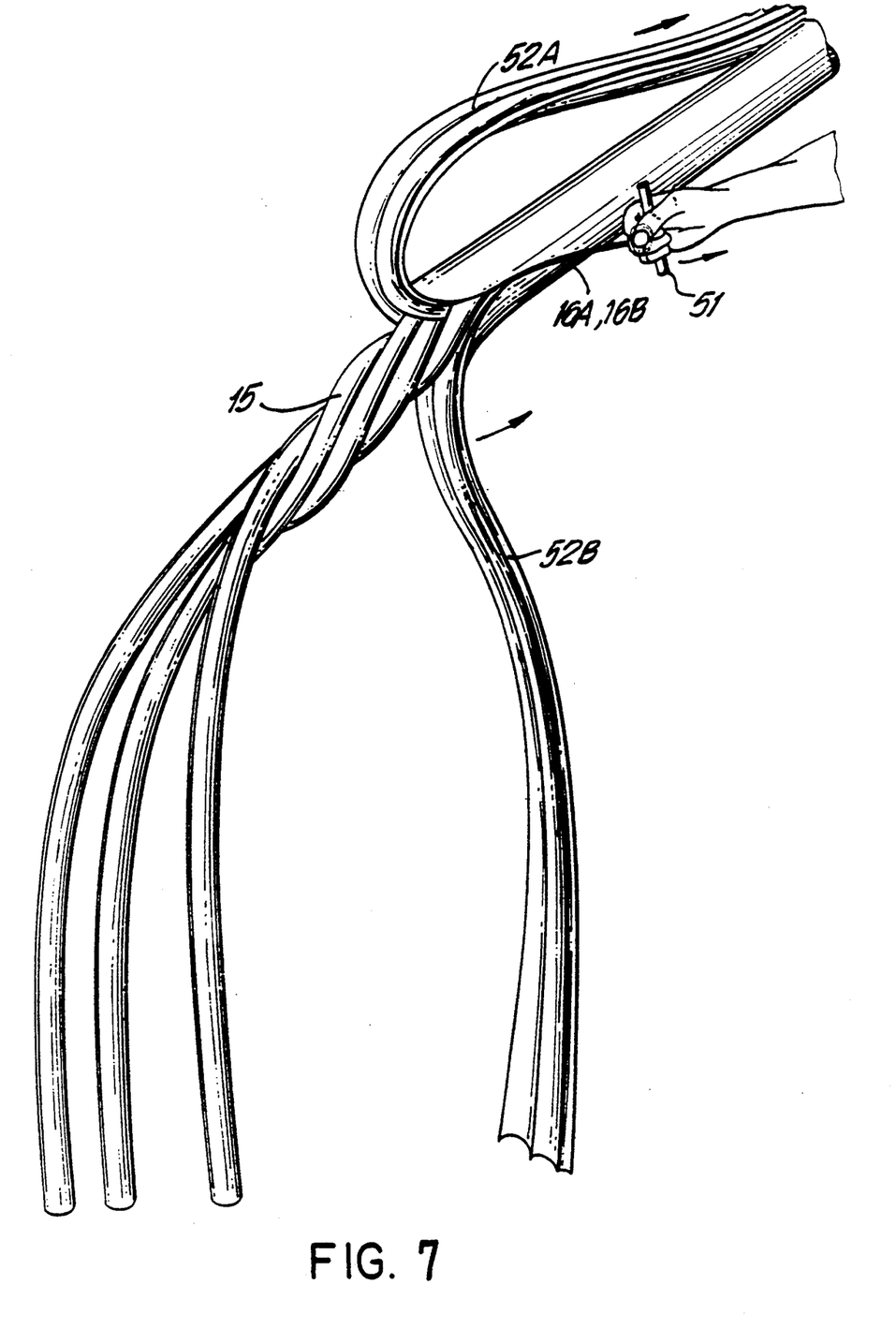
FIG. 7 is a perspective view of a length of the naval power cable in which the water blocking and jacket material is being manually remove from about the core conductor assembly, in accordance with the method of the present invention.

As illustrated in FIG. 7, the stripping of the outer jacket and water blocking layers involves first exposing a portion of each brilliantly colored strip cord 16A and 16B, by for example carving away a small portion of the outer jacket to expose an inch or so of each strip cord. Then by pulling on the strip cord with a gripping device, such as pliers, in the longitudinal direction, the strip cords will cut into and slice the integrally bonded jacket and water blocking material. When a few inches of strip cord are exposed, then this exposed strip cord can be wrapped around a blunt tool such as a dowel or metal rod 51 to effectively grip the same. Thereafter, the blunt tool can be manually gripped as shown in FIG. 7, and pulled along the longitudinal extent of the naval power cable, up to the desired predetermined length. This pulling action on each of the Kevlar ® cords, at about 180° apart from each other, simultaneously cuts the covalently bonded jacket layer and water blocking layer, into two strip-like layers 52A and 52B as shown. These strip-like layers can then be peeled backwardly in the direction of the unexposed power cable to expose the insulated conductors 11A, 11B and 11C for subsequent spreading and interconnection to power equipment and the like. Notably, the cut and peeled away jacket and water blocking material results in integrally connected strips of material, which facilitate the peeling procedure and substantially simplify the clean up of removed jacket and water blocking material aboard the naval vessel.

Figure 8:
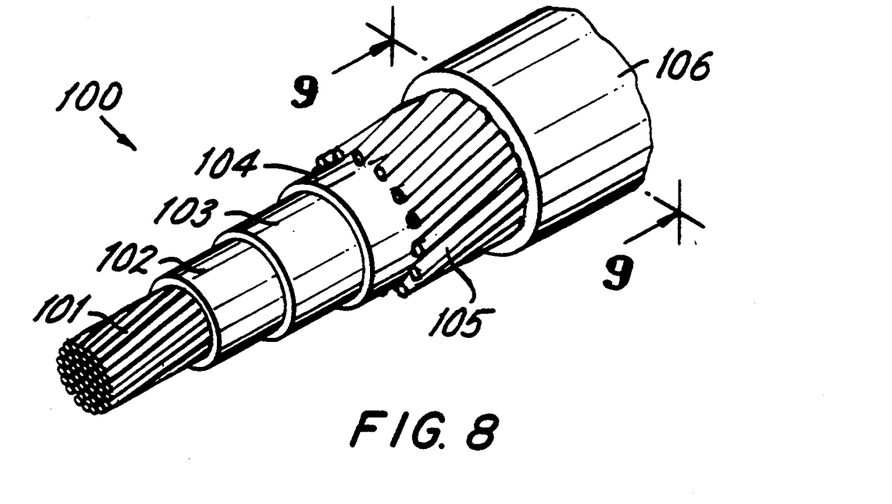
FIG. 8 is a perspective, partially broken away view of the underground primary distribution jacketed cable constructed in accordance with the principles of the present invention.

Another illustrated embodiment of the present invention is generally shown in FIGS. 8 through 11. FIG. 8 is a perspective, partially broken away view of the underground primary distribution jacketed cable in accordance with the present invention showing power cable 100 which comprises a central core of metallic electrical conductors 101, having a longitudinal extent and being insulated by first, second and third layers 102, 103 and 104 of insulation material. Notably, however, in accordance with the principles of the present invention, the underground primary distribution jacketed cable may include a number of electrical conductors other than one and insulation layers other than three.

As shown in FIG. 8, the metallic electrical conductors form a core conductor assembly, generally indicated by reference number 101. The metal conductors are preferably aluminum or copper, and the insulation layers are preferably a semiconducting strand shield insulation layer 102, an ethylene propylene or cross-linked polyethylene insulation layer 103, and a semiconducting shield insulation layer 104.

Figure 9:
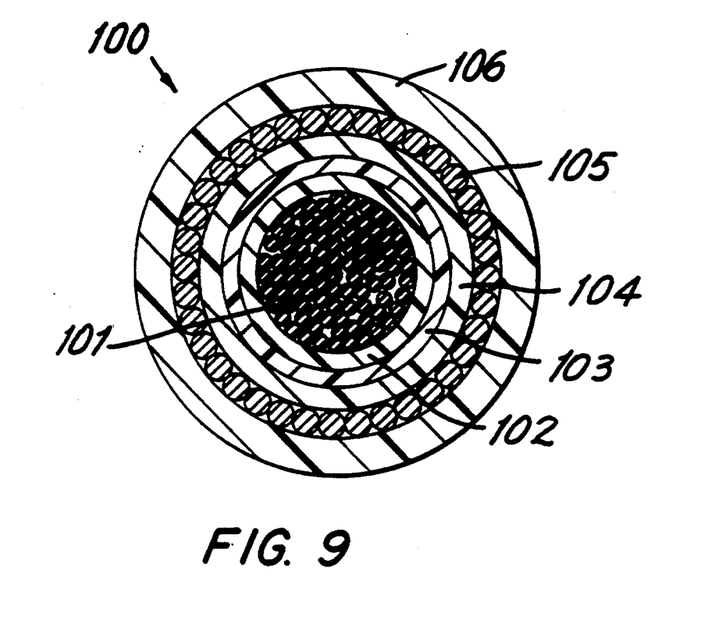
FIG. 9 is a cross-sectional view of the underground primary distribution jacketed cable of the present invention, taken along line 9—9 of FIG. 8.

As illustrated in FIGS. 8 and 9, core conductor assembly 101 has three screening layers of insulation 102, 103 and 104 disposed about the core conductor assembly 101. A metallic shield layer 105 is disposed about the outermost insulation layer 104, and the outer jacket layer 106 is disposed over and adjacent to the metallic shield layer 105. Metallic shield 105 is preferably comprised of copper or copper wires coated with a metallic alloy helically or longitudinally applied. The outer jacket 106 is preferably an extruded polymer sheath which may be thermoplastic or crosslinked and may consist of any number of different materials including polyethylenes (high density, low density, chlorinated polyethylenes, medium density, linear low density), PVC, rubber polymeric materials or thermoplastic deformation resistant compounds. Additionally, outer jacket 106 may be semiconducting or insulating.

Figure 10:
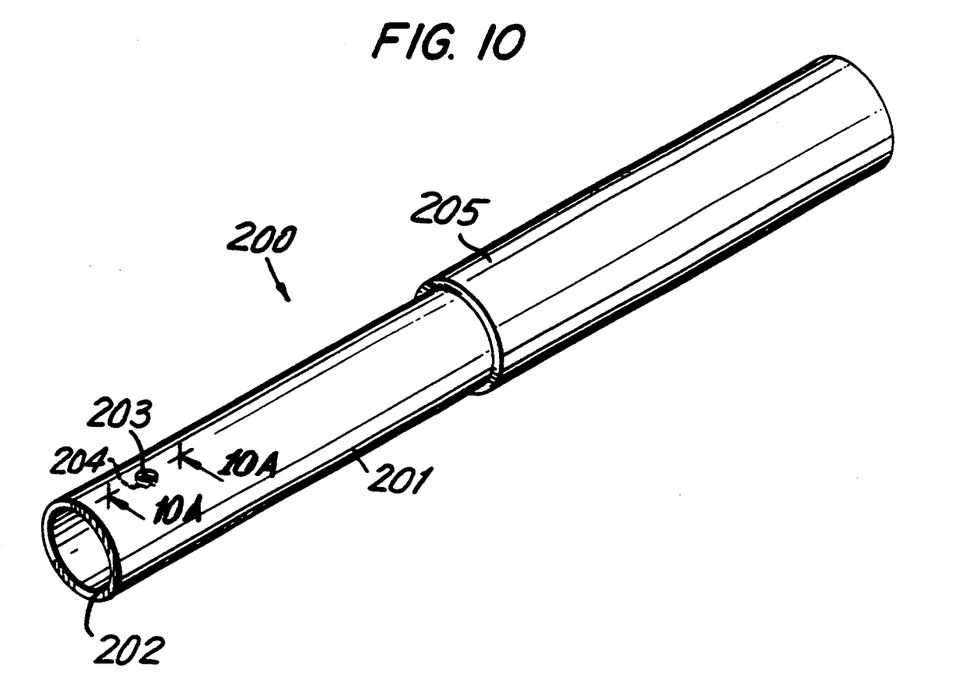
FIG. 10 is a perspective view of the special stripping tool adapted for use with the cables described herein.
Figure 10A:
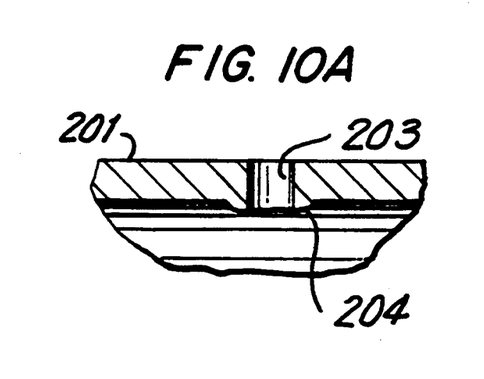
FIG. 10A is a partial, cross-sectional view high-lighting the cylindrical aperture.

FIG. 10 depicts a perspective view of the special stripping tool adapted for use with the cables described herein, and is generally designated with the numeral 200. Specialized stripping tool 200, specifically adapted for use in stripping the underground primary distribution jacketed cable 100, comprises a hollow cylindrical tube 201 and is made of a suitable rigid material such as metal or polymeric composite, with an end, defined by rim 202. Near rim 202 is produced a cylindrical aperture defined by rim 203 such as by drilling radially through from the outer surface of the tube 201 towards the interior of the tube. The burr 204 formed in the inside of the tubing is not removed and is used as part of the stripping method (see FIG. 10A). An optional grip 205 (as shown) may be placed around tube 201.

Figure 11:
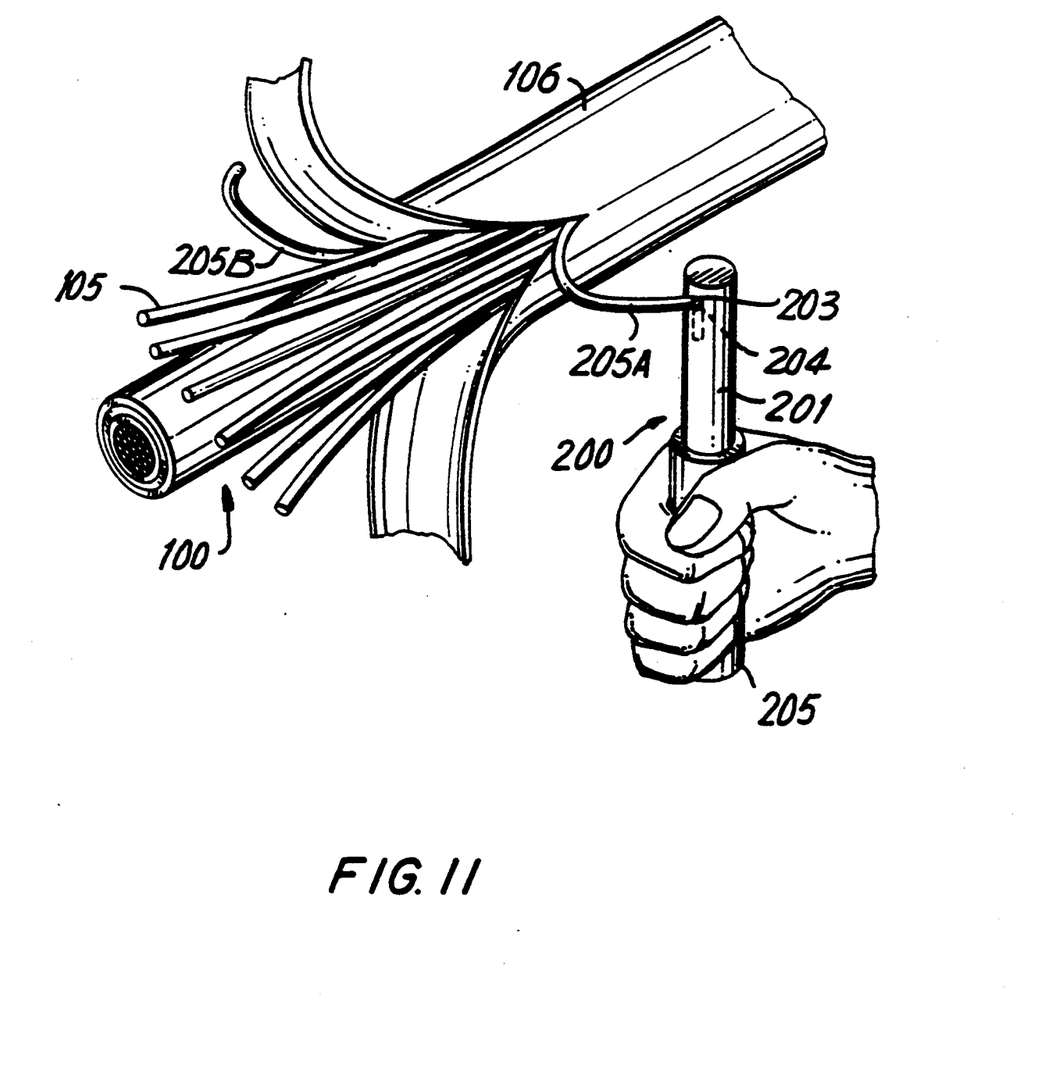
FIG. 11 is a perspective view of a length of the underground primary distribution jacketed cable in which the outer jacket material is being manually removed from about the metal shield assembly, in accordance with the method of the present invention.

FIG. 11 is a perspective view of a length of the underground primary distribution jacketed cable in which the outer jacket material is being manually removed from about the metal shield assembly, in accordance with the method of the present invention. In terminating or splicing underground primary distribution jacketed cable 100, it is necessary to remove the outer cable components from 12 to 48 inches. This includes removal of the outer jacket 106, the metallic shield 105 and insulation layers 102, 103 and 104. The specialized stripping tool and associated method expedites this process by quickly, easily and safely stripping the outer jacket layer 106.

The metallic shield layer 105, consisting of metal wires either helically or longitudinally applied, provide a spatially periodic pattern of potential strip cords along the longitudinal extent of the cable between insulation layer 104 and the outer jacket layer 106. This permits the resulting cable to be easily stripped of its outer jacket layer 106.

In general, the method of stripping the outer layers from the underground primary distribution jacketed cable involves first, exposing a portion each of at least two wires 205A and 205B that comprise the metallic shield 105. Only a very small portion of the metal wire 205A need be exposed initially (usually about 1 to 3 inches), and the exposed wire is crimped at its end at a 90° angle and inserted into the aperture defined by rim 203. Burr 204 at the end of the aperture defined by rim 203 holds the wire in the tube 201 when the strip tool 200 is pulled. A rolling action causes the strip tool 200 to pull on wire 205A which cuts through the outer jacket 106. This is repeated on the second wire 205B which allows the longitudinally cut jacket to be peeled away, exposing the layers underneath for further work.

While the particular embodiments shown and described above have proven to be useful in many applications in the power cable art, further modifications of the present invention herein disclosed will occur to persons skilled in the art to which the present invention pertains, and all such modifications are deemed to be within the scope and spirit of the present invention defined by the appended claims.

What is claimed is:

1. A method of stripping an electrical power cable, comprising the steps of:
    (a) providing an electrical power cable including a plurality of insulated electrical conductors each having a longitudinal extent and being helically intertwined with the other of said electrical conductor so as to form a core conductor assembly having a longitudinal extent and at least a pair of outer interstices adjacent said insulated electrical conductors, at least a pair of strip cords, each said strip cord being disposed along the longitudinal extent of said core conductor assembly and into and out of said outer interstices in a spatially periodic manner, and a water blocking layer disposed about said core conductor assembly and said strip cords so as to prevent passage of water along the interstices about said electrical conductors, and a jacket layer disposed over and adjacent to said water blocking layer; and
    (b) removing a predetermined length of said water blocking layer and said jacket layer by (i) exposing a portion of each strip cord, (ii) gripping each said strip cord with a tool, (iii) manually gripping said tool and pulling said strip cords along the longitudinal extent of said electrical power cable and up to said predetermined length of said cable, thereby cutting simultaneously said jacket layer and water blocking layer and forming at least two strip-like layers of jacket and water blocking material, and (iv) peeling each said strip-like layer of jacket and water blocking material, so as to expose said insulated conductors for spreading.

2. The method of claim 1, wherein step (a) further comprises providing said electrical power cable in which said pair of strip cords are diametrically opposed to each other along the longitudinal extent of said core conductor assembly.

3. A method of stripping an electrical power cable, comprising the steps of:
    (a) providing an electrical power cable including a plurality of electrical conductors each having a longitudinal extent, said electrical conductor forming a core conductor assembly having a longitudinal extent, a layer of insulating materials disposed longitudinally about said core conductor assembly, a metallic shield layer consisting of individual metal wires disposed longitudinally about said insulating material layer, and an outer jacket layer disposed longitudinally about said metallic shield layer;
    (b) providing a tool, specifically adapted for said power cable, said tool comprising a hollow cylindrical member made of a rigid material, said tool having a first and second end, said tool having a cylindrical aperture formed by a rim near said first end, said rim communicating with the interior of said hollow cylindrical member and forming a burr extending into the interior of said hollow cylindrical member; and
    (c) removing a predetermined length of said outer jacket layer by (i) exposing a portion each of at least two metal wires that form said metallic shield layer, (ii) crimping a first of said exposed wire at its end at a 90° angle, (iii) inserting the crimped end into said aperture in said stripping tool such that said burr holds the wire, (iv) manually pulling in a rolling action, said strip tool along the longitudinal extent of said electrical power cable and up to said predetermined length of said cable, thereby cutting said outer jacket layer, (v) releasing said tool from said first exposed wire, (vi) crimping a second of said exposed wire at its end at a 90° angle, inserting the second crimped end into said aperture in said stripping tool such that said burr holds the wire, manually pulling in a rolling action, said strip tool along the longitudinal extent of said electrical power cable and up to said predetermined length of said cable, thereby further cutting said outer jacket layer, and (vii) peeling each strip-like layer of outer jacket formed thereby, so as to expose said insulated conductors for spreading.

* * * * *